(12) United States Patent
Ali

(10) Patent No.: US 6,549,818 B1
(45) Date of Patent: Apr. 15, 2003

(54) COOKING APPLIANCE AND COOKING SYSTEM

(75) Inventor: Mohamed Ahmed Ali, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/513,864

(22) Filed: Feb. 28, 2000

Related U.S. Application Data

(60) Provisional application No. 60/145,530, filed on Jul. 26, 1999.

(51) Int. Cl.[7] .............................................. G06F 17/00
(52) U.S. Cl. .............................. 700/90; 705/26; 99/325; 219/720
(58) Field of Search .................... 700/90, 299, 300; 705/26; 99/325, 327, 332, 468; 219/702, 714, 719, 720

(56) References Cited

U.S. PATENT DOCUMENTS

| 4,649,810 | A | * | 3/1987 | Wong | 99/326 |
| 4,872,112 | A | * | 10/1989 | Hungerford | 700/90 |
| 6,009,794 | A | * | 1/2000 | Casey et al. | 99/330 |
| 6,121,593 | A | * | 9/2000 | Mansbery et al. | 219/679 |
| 6,137,095 | A | * | 10/2000 | Kashimoto et al. | 219/702 |
| 6,180,934 | B1 | * | 1/2001 | Ishizaki et al. | 219/720 |
| 6,236,974 | B1 | * | 5/2001 | Kolawa et al. | 705/7 |
| 6,359,270 | B1 | * | 3/2002 | Bridson | 219/679 |
| 6,444,965 | B1 | * | 9/2002 | Ha et al. | 219/702 |

* cited by examiner

Primary Examiner—Leo Picard
Assistant Examiner—Paul Rodriguez
(74) Attorney, Agent, or Firm—Armstrong Teasdale LLP

(57) ABSTRACT

A cooking appliance, such as a stove or oven, includes a food-heating unit having a computer-controlled temperature controller and an Internet-accessing appliance computer having a computer program. The program downloads a cooking recipe from the Internet. The recipe includes a food list and pre-cooking directions which are displayed to a user and also includes a cooking temperature schedule which is used by the temperature controller of the food-heating unit. A cooking system includes the cooking appliance and an Internet-accessible host computer containing cooking recipes.

18 Claims, 2 Drawing Sheets

COOKING APPLIANCE AND COOKING SYSTEM

This application claims priority of a Provisional Application entitled "Internet-Linked Cooking Range" by Mohamed A. Ali, Ser. No. 60/145,530 filed Jul. 26, 1999.

BACKGROUND OF THE INVENTION

The present invention relates generally to cooking food, and more particularly to a cooking appliance and cooking system.

It is known for a food company to deliver food bought over the Internet. It is also known that cooking recipes may be found on the Internet. Cooking appliances include, without limitation, electric and gas cooktops, ovens, and ranges (i.e., an appliance containing both a cooktop and an oven) and microwave ovens. An oven is on the market which uses an upper and a lower halogen lamp and/or microwaves for cooking and which includes a computer. This oven comes with over 100 preset recipe cooking programs which automatically set the cooking time, the power level of the upper halogen light, the power level of the lower halogen light, and the power level of the microwaves depending on computer-prompted user-inputs for the type of food (e.g., chicken), the specific kind of food (e.g., boneless), the total weight of food (e.g., one pound), the number of pieces of food (e.g., two), and the desired doneness (e.g., well done). The user can input up to thirty additional recipe cooking programs by program number (e.g., one), cooking time (e.g., ten minutes), the power level of the upper halogen light (e.g., six), the power level of the lower halogen light (e.g., seven), and the power level of the microwaves (e.g., four). The oven then will automatically cook the food and alert the user when the cooking is completed. What is needed is a cooking appliance which makes cooking more convenient.

BRIEF SUMMARY OF THE INVENTION

In an expression of an embodiment of the invention, a cooking appliance includes a food-heating unit and an appliance computer. The food-heating unit has a computer-controlled temperature controller, and the appliance computer contains an executable program. The program inputs a cooking recipe including a food list, pre-cooking directions, and a cooking temperature schedule. The appliance computer displays the food list and the pre-cooking directions to a user and outputs a signal representing the cooking temperature schedule to the temperature controller of the food-heating unit during execution of the program. In one design, the appliance computer is an Internet-accessing appliance computer, and the cooking recipe is an Internet-downloaded cooking recipe. In another design, the program of the appliance computer inputs a user profile and modifies the cooking recipe based on the inputted user profile.

In another expression of an embodiment of the invention, a cooking system includes a host computer and a cooking appliance. The host computer contains cooking recipes each including a food list, pre-cooking directions, and a cooking temperature schedule. The cooking appliance includes a food-heating unit and an appliance computer. The food-heating unit has a computer-controlled temperature controller, the appliance computer can be linked to the host computer, and the appliance computer contains an executable program. The program inputs one of the cooking recipes from the host computer. The appliance computer displays the food list and the pre-cooking directions of the one cooking recipe to a user and outputs a signal representing the cooking temperature schedule of the one cooking recipe to the temperature controller of the food-heating unit during execution of the program. In one design, the appliance computer is an Internet-accessing appliance computer, the host computer is an Internet-accessible host computer, and the cooking recipe is an Internet-downloaded cooking recipe. In another design, the appliance computer includes an input/output portion for ordering food listed in a cooking recipe's food list from a grocery computer of a food supplier.

Several benefits and advantages are derived from the invention. Having a cooking appliance which downloads cooking recipes from the Internet and which automatically heats the food as required by the cooking recipe makes cooking more convenient by having virtually instant access to an unlimited number of cooking recipes and by having automatic control of the heating of the food. Using a cooking appliance to order recipe-required food over the Internet makes food shopping easier. Having a cooking appliance automatically modify a cooking recipe based on a user profile saves a user from having to manually alter each recipe based on personal taste (e.g., more salt) or health concerns (e.g., less salt).

DETAILED DESCRIPTION OF THE INVENTION

Figure 1:
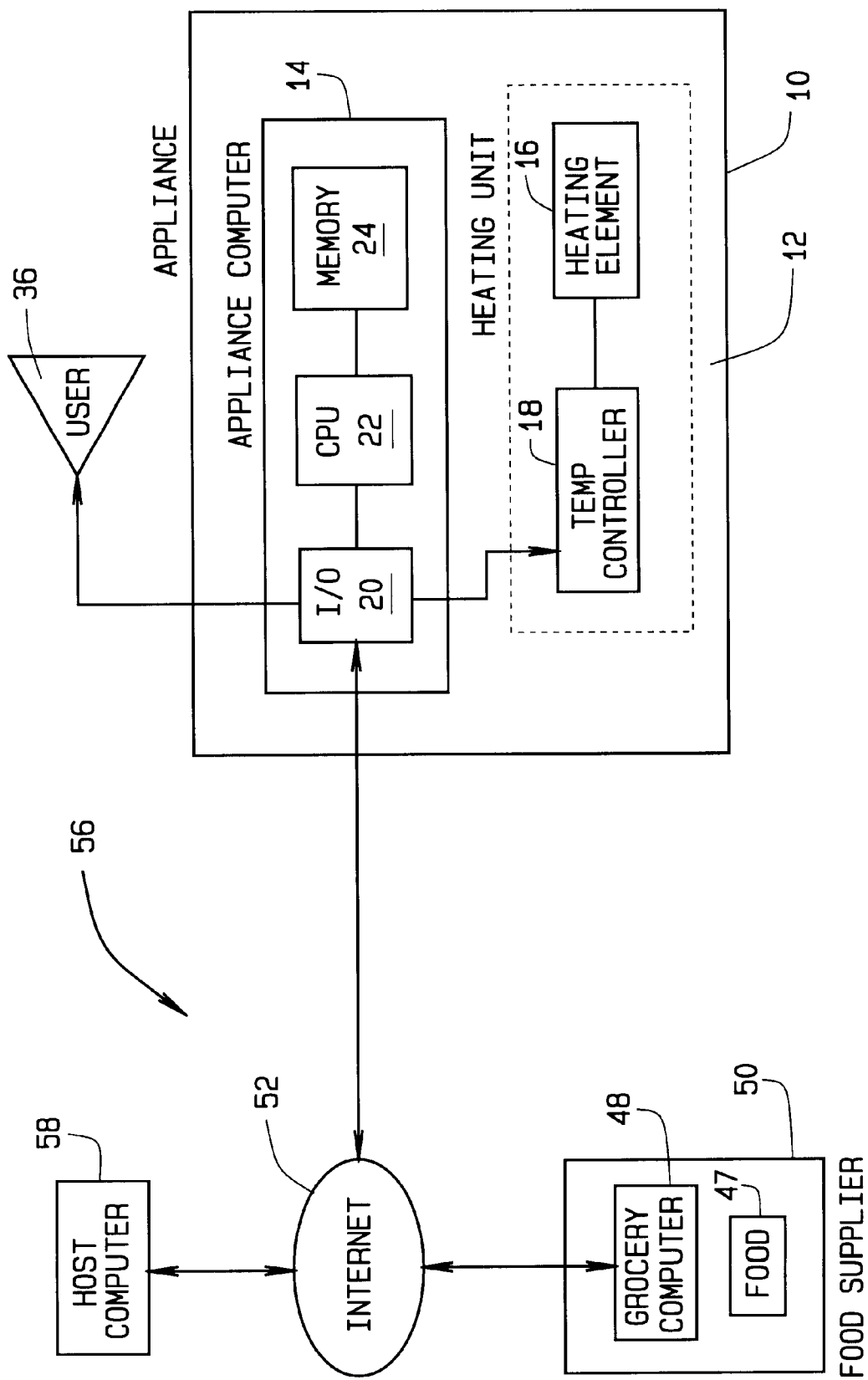
FIG. 1 is a schematic diagram of an embodiment of a cooking system, including a cooking appliance, of the invention.
Figure 2:
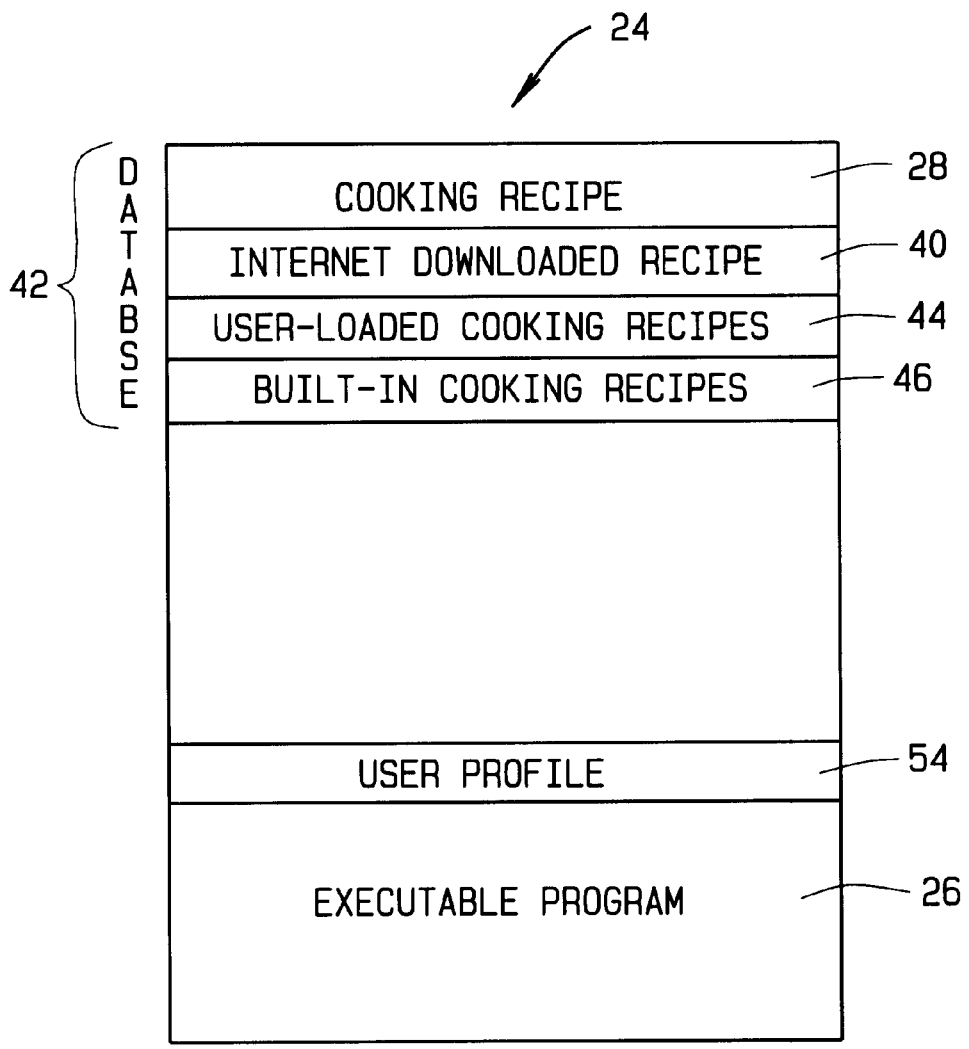
FIG. 2 is schematic diagram of the memory portion of the appliance computer shown in FIG. 1 wherein the memory portion contains a database which includes cooking recipes.
Figure 3:
FIG. 3 is a schematic diagram of one of the cooking recipes of the database shown in FIG. 2.

Referring now to the drawings, FIGS. 1 through 3 schematically show an embodiment of the present invention. In a first expression of the embodiment of the present invention shown in the figures, a cooking appliance 10 includes a food-heating unit 12 and an appliance computer 14. The term "computer" includes, without limitation, microprocessor. Examples of cooking appliances 10 include, without limitation, electric and gas cooktops, ovens, and ranges (i.e., an appliance containing both a cooktop and an oven) microwave ovens, and halogen-lamp ovens. The food-heating unit 12 has at least one food-heating element 16 such as, without limitation, a gas burner, an electric heating coil, a microwave generator, and/or a halogen lamp. The food-heating unit 12 also has a computer-controlled temperature controller 18 which controls the operation of the at-least-one food-heating element 16. The temperature controller 18 may directly or indirectly control the temperature of the food-heating element 16 by, for example and without limitation, controlling a gas valve of a gas burner, controlling the current in an electric heating coil, controlling the power and on/off cycle times of a microwave generator, and/or controlling the on/off cycle times of a halogen lamp. The appliance computer 14 includes an input/output portion 20, a central processing unit 22, and a memory portion 24. The appliance computer 14 contains an executable program 26 in the memory portion 24. The program 24 inputs from the memory portion 24 a cooking recipe 28 which includes a food list 30, pre-cooking directions 32, and a cooking temperature schedule 34. The appliance computer 14 displays the food list 30 and the pre-cooking directions 32 to a user 36 (e.g., a cook) through the input/output portion 20. The appliance computer 14 outputs a signal representing the cooking temperature schedule 34 to the temperature controller 18 of the food-heating unit 12 during execution of the program 26 by the central processing unit 22. The signal specifies how the temperature controller 18 is to control the temperature of the food-heating element 16.

The appliance computer 14 may communicate with the temperature controller 18 of the food-heating unit 12 through a computer cable, an infrared link, house wiring, etc. The appliance computer 14 (or any component thereof) is otherwise free to be located on the appliance housing (as suggested by FIG. 1), on the wall of a kitchen (not shown), on a desk in another room (not shown), etc. The input/output portion 20 may include without limitation, a monitor, a keyboard, a mouse, a trackball, a touch screen, a microphone, a modem, a floppy drive, or a CD drive (such components being omitted from the figures for clarity) in any quantity and/or combination. It is noted that the program 26 resides in the memory portion 24, that the cooking recipe 28 is inputted from the memory portion 24 into the central processing unit 22, and that the memory portion 24 may include, without limitation, random-access memory, read-only memory, etc.

In one example, the appliance computer 14 is an Internet-accessing appliance computer 38, and the cooking recipe 28 is an Internet-downloaded cooking recipe 40. The Internet-accessing appliance computer 38 may be in direct communication with an Internet service provider or may be in indirect communication with an Internet service provider. An example, without limitation, of the later is the Internet-accessing appliance computer 38 having a computer cable connection with a personal computer (not shown) located in another room of the house, such personal computer being in direct communication with an Internet service provider. In another example, the appliance computer 14 contains a database 42 including user-loaded cooking recipes 44, and the cooking recipe 28 is one of the user-loaded cooking recipes 44. In a further example, the appliance computer 14 contains a database 42 including built-in cooking recipes 46, and the cooking recipe 28 is one of the built-in cooking recipes 46. It is understood that the database 42 resides in the memory portion 24, and that the cooking recipe 28, the Internet-downloaded cooking recipe 40, the user-loaded cooking recipes 44, and the built-in cooking recipes 46 are all considered to belong to the database 42.

In one design, when the appliance computer 14 is an Internet-accessing appliance computer 38, the Internet-accessing appliance computer 38 includes an input/output portion 20 for ordering food 47 from the food list 30 (of the cooking recipe 28) from a grocery computer 48 of a food supplier 50 over an Internet 52. In another design, the appliance computer 14 (whether or not it is an Internet-accessing appliance computer 38) alerts a user 36 when the cooking temperature schedule 34 is completed. The user 36 may be alerted by the sound of a buzzer, bell, etc. In a further design, the program 26 inputs a user profile 54, and the program 26 modifies the cooking recipe 28 (such as an Internet-downloaded cooking recipe 40) based on the user profile 54. The user profile 54 may include, without limitation, food preferences (e.g., more salt), foods to avoid (e.g., egg yolks for cholesterol reasons), foods to restrict (e.g., sugar for weight control reasons), etc. Recipe modifications made by the program 26 may include, without limitation, increasing salt by twenty percent, substituting egg whites for egg yolks, and replacing half the sugar with apple sauce, etc.

A food list 30 of a cooking recipe 28 may include, for example, one cup vegetable oil, one and a half cups sugar, three eggs, one teaspoon vanilla, etc. Precooking directions 32 of a cooking recipe 28 man include, for example, combining sugar, oil, eggs, vanilla, etc. in a large mixing bowl; beat with an electric mixer at medium speed for one minute; etc. A cooking temperature schedule 34 of a cooking recipe 28 may include, for example, heating in an oven at three hundred fifty degrees for forty-five minutes; then heating at two hundred degrees for fifteen minutes; etc.

Writing the program 26 is within the ordinary level of skill of a computer programmer. Applicant has had experience writing computing programs and estimates the effort required for a programmer to write the program 26 should not exceed one month. It is understood that the cooking recipe 28 would be in a predefined format usable by the program 26. It is also understood that the program 26 would adjust food quantities, cooking times, etc. if the cooking recipe 28 served, for example, four, but the user 36 wanted to serve some other number of servings.

In a second expression of the embodiment of the present invention shown in the figures, a cooking system 56 includes a host computer 58 and a cooking appliance 10. The host computer 58 contains cooking recipes each including a food list, pre-cooking directions, and a cooking temperature schedule. The cooking appliance 10 includes a food-heating unit 12 and an appliance computer 14. The food-heating unit 12 has at least one food-heating element 16. The food-heating unit 12 also has a computer-controlled temperature controller 18 which controls the operation of the at-least-one food-heating element 16. The appliance computer 14 includes an input/output portion 20, a central processing unit 22, and a memory portion 24. The appliance computer 14 can be linked to the host computer 58, and the appliance computer 14 contains an executable program 26 in the memory portion 24.

The program 24 inputs from the memory portion 24 one of the cooking recipes 28 from the host computer 58. The appliance computer 14 displays the food list 30 and the pre-cooking directions 32 of the cooking recipe 28 to a user 36 (e.g., a cook) through the input/output portion 20. The appliance computer 14 outputs a signal representing the cooking temperature schedule 34 of the cooking recipe 28 to the temperature controller 18 of the food-heating unit 12 during execution of the program 26 by the central processing unit 22. The signal specifies how the temperature controller 18 is to control the temperature of the food-heating element 16.

In one example, the host computer 58 is an Internet-accessible host computer 60, and the appliance computer 14 is an Internet-accessing appliance computer 38 linkable to the Internet-accessible host computer 60 over an Internet 52, and the cooking recipe 28 is an Internet-downloaded cooking recipe 40. In another example, the appliance computer 14 contains a database 42 including user-loaded cooking recipes 44. In a further example, the appliance computer 14 contains a database 42 including built-in cooking recipes 46. It is understood that the database 42 resides in the memory portion 24, and that the cooking recipe 28, the Internet-downloaded cooking recipe 40, the user-loaded cooking recipes 44, and the built-in cooking recipes 44 are all considered to belong to the database 42.

In one design, when the appliance computer 14 is an Internet-accessing appliance computer 38, the Internet-accessing appliance computer 38 includes an input/output portion 20 for ordering food 47 from the food list 30 (of the cooking recipe 28) from a grocery computer 48 of a food supplier 50 over an Internet 52. In another design, the appliance computer 14 (whether or not it is an Internet-accessing appliance computer 38) alerts a user 36 when the cooking temperature schedule 34 is completed. In a further design, the program 26 inputs a user profile 54, and the program 26 modifies the cooking recipe 28 (such as an Internet-downloaded cooking recipe 40) based on the user profile 54. In an additional design, the program 26 of the appliance computer 14 (or the Internet-accessing appliance computer 38) inputs a user profile 54 and sends the user profile 54 to the host computer 58 (or Internet-accessible host computer 60) which modifies the cooking recipe 28 (or Internet-downloaded cooking recipe 40) based on the sent user profile 54 before downloading the cooking recipe 28 (or Internet-downloaded cooking recipe 40) as an input to the program 26 of the appliance computer 14. The user profile 54 may include, without limitation, food preferences (e.g., more salt), foods to avoid (e.g., egg yolks for cholesterol reasons), foods to restrict (e.g., sugar for weight control reasons), etc. Recipe modifications made by the program 26 may include, without limitation, increasing salt by twenty percent, substituting egg whites for egg yolks, and replacing half the sugar with apple sauce), etc.

Loading cooking recipes into the host computer 58 and writing the program 26 for the appliance computer 14 are within the ordinary level of skill of a computer programmer. Applicant has had experience writing computing programs and estimates the effort required for a programmer to load some cooking recipes into the host computer 58 and write the program 26 for the appliance computer should not exceed one month. It is understood that the cooking recipe 28 would be in a predefined format usable by the program 26. It is also understood that the program 26 would adjust food quantities, cooking times, etc. if the cooking recipe 28 served, for example, four, but the user 36 wanted to serve some other number of servings.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A cooking appliance comprising:
   a) a food-heating unit having a computer-controlled temperature controller; and
   b) an appliance computer containing an executable program which inputs a cooking recipe including a food list, pre-cooking directions, a user profile, and a cooking temperature schedule, wherein said appliance computer displays said food list and said pre-cooking directions to a user, wherein said appliance computer outputs a signal representing said cooking temperature schedule to said temperature controller of said food-heating unit during execution of said program, and wherein said program inputs said user profile and modifies said cooking recipe based on said user profile.

2. The cooking appliance of claim 1, wherein said appliance computer is an Internet-accessing appliance computer, and wherein said cooking recipe is an Internet-downloaded cooking recipe.

3. The cooking appliance of claim 1, wherein said appliance computer is an Internet-accessing appliance computer, and wherein said appliance computer includes an input/output portion for ordering food from said food list from a grocery computer of a food supplier over an Internet.

4. The cooking appliance of claim 1, wherein said appliance computer contains a database including user-loaded cooking recipes, and wherein said cooking recipe is one of said user-loaded cooking recipes.

5. The cooking appliance of claim 1, wherein said appliance computer contains a database including built-in cooking recipes, and wherein said cooking recipe is one of said built-in cooking recipes.

6. A cooking appliance comprising:
   a) a food-heating unit having a computer-controlled temperature controller; and
   b) an Internet-accessing appliance computer containing an executable program which inputs an Internet-downloaded cooking recipe including a food list, pre-cooking directions, a user profile, and a cooking temperature schedule, wherein said Internet- accessing appliance computer displays said food list and said pre-cooking directions to a user, and wherein said Internet-accessing appliance computer outputs a signal representing said cooking temperature schedule to said temperature controller of said food-heating unit during execution of said program, and wherein said program inputs said user profile and modifies said Internet-downloaded cooking recipe based on said user profile.

7. The cooking appliance of claim 6, wherein said Internet-accessing appliance computer includes an input/output portion for ordering food from said food list from a grocery computer of a food supplier over an Internet.

8. The cooking appliance of claim 7, wherein said Internet-accessing appliance computer alerts a user when said cooking temperature schedule is completed.

9. The cooking appliance of claim 6, wherein said Internet-accessing appliance computer alerts a user when said cooking temperature schedule is completed.

10. A cooking system comprising:
    a) a host computer containing a plurality of cooking recipes each including a food list, pre-cooking directions, a user profile and a cooking temperature schedule; and
    b) a cooking appliance including:
       (1) a food-heating unit having a computer-controlled temperature controller, and
       (2) an appliance computer linkable to said host computer and containing an executable program which inputs one of said cooking recipes from said host computer, wherein said appliance computer displays said food list and said pre-cooking directions of said one of said cooking recipes to a user, wherein said appliance computer outputs a signal representing said cooking temperature schedule of said one of said cooking recipes to said temperature controller of said food-heating unit during execution of said program; and wherein said program inputs said user profile and modifies said cooking recipe based on said user profile.

11. The cooking system of claim 10, wherein said appliance computer contains a database including user-loaded cooking recipes.

12. The cooking system of claim 10, wherein said appliance computer contains a database including built-in cooking recipes.

13. A cooking system comprising:
    a) an Internet-accessible host computer containing a plurality of cooking recipes each including a food list, pre-cooking directions, a user profile, and a cooking temperature schedule; and b) a cooking appliance including:
  (1) a food-heating unit having a computer-controlled temperature controller; and
  (2) an Internet-accessing appliance computer linkable to said Internet-accessible host computer over an Internet and containing an executable program which inputs one of said cooking recipes from said Internet-accessible host computer, wherein said Internet-accessing appliance computer displays said food list and said pre-cooking directions of said one of said cooking recipes to a user, wherein said Internet-accessing appliance computer outputs a signal representing said cooking temperature schedule of said one of said cooking recipe to said temperature controller of said food-heating unit during execution of said program, and wherein said one of said cooking recipes is modified in response to said user profile.

14. The cooking system of claim 13, also including a grocery computer of a food supplier, wherein said Internet-accessing appliance computer includes an input/output portion for ordering food from said food list from said grocery computer of said food supplier when said Internet-accessing appliance computer is linked to said grocery computer over said Internet.

15. The cooking appliance of claim 14, wherein said Internet-accessing appliance computer contains a database including built-in cooking recipes.

16. The cooking system of claim 15, wherein said database includes user-loaded cooking recipes.

17. The cooking appliance of claim 16, wherein said Internet-accessing appliance computer alerts a user when said cooking temperature schedule is completed.

18. The cooking appliance of claim 13, wherein said program of said Internet-accessing appliance computer inputs said user profile and sends said user profile to said Internet-accessible host computer, and wherein said Internet-accessible host computer modifies said one of said cooking recipes based on said sent user profile before downloading said one of said cooking recipes as an input to said program of said Internet-accessing appliance computer.

* * * * *